Patented May 6, 1941

2,241,011

UNITED STATES PATENT OFFICE 2,241,011

PROCESS FOR RESOLVING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Original application May 12, 1939, Serial No. 273,223, now Patent No. 2,226,116, dated December 24, 1940. Divided and this application October 23, 1939, Serial No. 300,845

15 Claims. (Cl. 252—341)

This invention relates to materials, compounds, and compositions of matter of the kind that are used to treat emulsions of mineral oil and water, such as petroleum emulsions, for the purpose of separating the oil from the water, the present application being a division of our pending application Serial No. 273,223, filed May 12, 1939, now Patent No. 2,226,116, dated December 24, 1940.

One object of our invention is to provide a new material or composition of matter that is particularly adapted for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide a method by which said new material or composition of matter can be manufactured readily and economically.

The treating agent or demulsifier employed in our present process is a new composition of matter consisting of a certain kind of ester, or condensation product or polymerization product derived by reaction between: (A) a poly-basic carboxy acid body of the kind characterized by the presence of at least one unneutralized carboxylic radical, and at least one oxy-acyl radical derived from a detergent-forming monocarboxy acid; and (B) a tertiary methylene diamine, characterized by freedom from any detergent-forming acid radical. The diamine which is employed is characterized by freedom from any oxy-acyl radical derived from a detergent-forming monocarboxy acid linked to an amino nitrogen atom by a hydrocarbon radical, or by its obvious functional equivalent, such as a hydrocarbon radical, interrupted at least once by an oxygen atom; said non-acylated tertiary methylene diamine being additionally characterized by having at least one alcoholic hydroxyl radical. The completed compound is additionally characterized by the fact that the polybasic carboxy acid compound is united to the diamine by virtue of a carboxyl radical attached to the said polybasic acid residue, as differentiated from a carboxyl attached to the detergent-forming acid residue.

As to comparable compositions of matter in which the diamine does contain as an integral part of the molecule an oxy-acyl radical derived from a detergent-forming acid body, and characterized by the fact that the polybasic acid is not necessarily joined either directly or indirectly to a detergent-forming acid, reference is made to the co-pending application for patent, Serial No. 273,220, filed May 12, 1939, by Melvin De Groote, Bernhard Keiser and Arthur F. Wirtel now Patent No. 2,226,115, dated December 24, 1940; said co-pending application also contemplating the use of the therein described compositions of matter as demulsifiers for oil field emulsions.

It is well known that certain monocarboxy organic acids containing approximately 8 carbon atoms or more, and not more than 32 carbon atoms, are characterized by the fact that they combine with alkalis to produce soap or soap-like materials. These detergent-forming acids include fatty acids, resin acids, petroleum (naphthenic) acids, etc. For the sake of convenience, these acids will be referred to by the formula R.COOH. Other monocarboxy acids which do not form detergents are the kind exemplified by acetic acid, propionic acid, heptoic acid, and the like, i. e., acids containing from two to seven carbon atoms. For convenience, these acids will be indicated by the formula R'.COOH.

It is well known that diamines, and particularly those having pronounced basic properties, may be derived by various means, provided that the resultant diamine is characterized by the fact that the two amino nitrogen atoms are not attached to the same carbon atom. Such diamines, generally referred to as alkylene diamines, are well known and may be characterized by ethylene diamine. The present invention does not contemplate the use of diamines of this type. Derivatives of the diamines herein contemplated are characterized by being a methylene diamine derivative, i. e., a derivative of the hypothetical methylene diamine

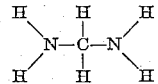

Methylene diamine is almost unknown for practical purposes, since it is very unstable in the form of a free base, but does exist in the form of alkylated or acylated derivatives. In view of this fact, it becomes obvious that the new chemical compound or composition of matter previously referred to must necessarily be obtained indirectlyl, insofar that the parent diamine is almost non-existent.

It is well known that a large number of secondary amines are available which may be designated by the formula type:

in which B' represents an alkyl, aralkyl, alicyclic, aryl, alkylol, aralkylol, hydroxy alicyclic, heterocyclic, or other equivalent radical; and B'' an alkylol, aralkylol, hydroxy, alicyclic, or similar radical. Similarly, the formula:

represents a secondary amine, in which a hydroxy hydrocarbon radical may or may not be present as a substituent for an amino hydrogen atom.

It is well known that aldehydes, particularly the aldehydes of relatively low molecular weight, such as formaldehyde, acetaldehyde, aldol, furfural, benzaldehyde, phenyl-acetaldehyde, phenyl-octaldehyde, hexahydrobenzaldehyde, etc., can combine with two moles of a secondary amine, so as to yield a methylene diamine, characterized by the fact that the two amino nitrogen atoms are attached to the same carbon atom. Such reaction may be indicated in the following manner:

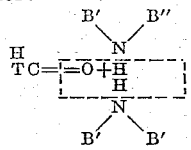

The amino so produced may be indicated by the following formula:

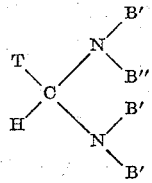

in which, T may represent a hydrogen atom derived from formaldehyde, or may represent a radical derived from acetaldehyde, propionaldehyde, butyraldehyde, heptaldehyde, lauric aldehyde, palmitic aldehyde, or stearic aldehyde, etc. Naturally, B'' may occur more than once and B' less than three times. Similarly, instead of aliphatic aldehydes, one may employ heterocyclic aldehydes, such as furfuraldehyde, or aromatic aldehydes, such as benzaldehyde, or an aralkyl aldehyde, such as phenylacetaldehyde. One may also employ alicyclic aldehydes, such as hexahydrobenzaldehyde. Unsaturated aldehydes, such as acrolein, crotonaldehyde, or tiglic aldehyde, may be employed. As previously indicated, B' may represent radicals, such as methyl, ethyl, propyl, butyl, amyl, hexyl, octyl, decyl, hexadecyl, octadecyl or similar radicals. Similarly B' may represent an aralkyl radical, such as benzyl radical, ethyl benzyl radical, dimethyl benzyl radical, an alicyclic radical, such as the cyclohexyl, methyl cyclohexyl, etc.; likewise, B', as well as B'', may represent radicals, such as hydroxy ethyl, hydroxy propyl, hydroxy butyl, and other similar radicals, including a $C_6H_4C_2H_4OH$ radical, or a $C_6H_{10}OH$ radical. Other radicals include the furfural radical, or hydroxy derivatives thereof. Piperidine may be considered as a special adaptation, in which one radical replaces two amino hydrogen atoms.

As previously indicated, B' may be selected from any of the type of radicals above mentioned; whereas, B'' is limited to those radicals in which there is an alcoholic hydroxy group present, such as an alkylol radical, etc.

It is to be noted that the methylene diamine, expressed by the above formula, is a tertiary diamine in the sense that neither amino nitrogen atom has attached thereto a replaceable hydrogen atom. For convenience, the above formula may be rewritten as follows, so as to indicate that there is present an alcoholic hydroxyl radical:

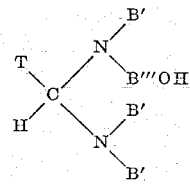

in which B'''OH is obviously the monovalent hydroxy hydrocarbon radical, such as an alkylol radical or the like. It is well known that amines, particularly non-aryl, such as triethanolamine or the like, can be acylated by reaction with lower fatty acids, i. e., the non-detergent-forming type or a suitable functional derivative thereof, such as the acyl chloride or the anhydride, or even the ester. If the tertiary hydroxy methylene diamine of the kind just described is reacted with such low molecular weight monocarboxy acid, the reaction may be indicated in the following manner:

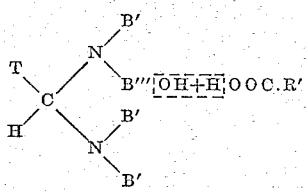

with the formation of an intermediate ester, which may be indicated in the following manner:

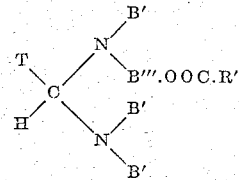

Such intermediate esters can react with polybasic acids, such as phthalic anhydride, provided there is present at least one alcoholic hydroxyl radical. As previously intimated, the composition of matter herein contemplated is not concerned with such derivatives of a polybasic acid, such as phthalic anhydride, per se (except under conditions hereinafter described), but with derivatives which, in addition to having the phthalic acid residue or a similar polybasic acid residue, also contain as an integral part of the molecular residue derived from a detergent-forming acid, i. e., one having at least eight carbon atoms and not more than 32 carbon atoms, as previously described. Furthermore, the union or combination of the two reactants must be by virtue of a carboxy radical attached to the polybasic carboxy acid radical or residue.

Before turning to a description of such polybasic acid compounds of the type herein contemplated for esterification with the hydroxylated tertiary methylene diamine, it may be desirable to indicate the various forms of the hydroxylated amine itself. Attention has already been directed to the fact that the hydroxyl radical may appear as part of a substituted hydrocarbon radical, such as a part of an alkylol radical. In addition to this fact, it may appear as part of the radical derived from the aldehyde. For instance, if, instead of being derived from acetaldehyde, for example, the diamine is derived from aldol or similar hydroxylated aldehydes, then obviously such alcoholiform hydroxyl present in the residual aldehyde radical can react with the polybasic carboxy acid compound of the kind hereinafter described. Needless to say, although the hydroxylated tertiary methylene diamine must contain at least one hydroxyl, it may contain a large number of hydroxyls. For instance, if, instead of being derived from a secondary amine, such as diethanolamine, dipropanolamine, dibutanolamine, etc., one employs ethanol glycerylamine, propanol glycerylamine, or diglycerylamine, naturally the alcoholic hydroxyl radicals available for esterification would be greatly increased in number. Amines derived from diglycerol, instead of glycerol, would furnish radicals containing three hydroxyls, even after attachment to the amino nitrogen atom. If, for example, one obtained a diamine containing four diglyceryl radicals, it would appear that there might be at least 12 hydroxyl radicals present, and there might even be present at least one more if aldol or a higher homologue were employed as a reactant in the formation of the diamine.

In addition to aldol, other similar hydroxy aldehydes or aldehyde-alcohols may be employed. As to such aldehydes other than aldol, reference is made to Richter's Organic Chemistry, (Allott), volume 1, third English edition, 1934, pages 389–391.

In view of what has been said previously, it does not appear necessary to enumerate various suitable amines which may be employed, but it may be well to indicate that among those which may be employed are the following: diethanolamine, dipropanolamine, dibutanolamine, dioctanolamine, dipentanolamine, glyceryl hexanolamine, methyl glycerylamine, ethyl glycerylamine, propyl glycerylamine, cyclohexyl glycerylamine, benzyl glycerylamine; dibenzylamine, phenylmonoethanolamine, ethyl benzylamine, methyl benzylamine, propyl benzylamine, naphthylmonoethanolamine, cyclohexyl ethylamine, cyclohexyl propylamine, cyclohexyl hexylamine, diethylamine, dipropylamine, diamylamine, dihexylamine, dioctylamine, diglycerylamine, etc. In all the previous examples, each radical indicates a substituent for an amino hydrogen atom. Similarly, amines can be obtained from polyglycerols or polyglycols, as for instance, the secondary amines, indicated by the following formulas:

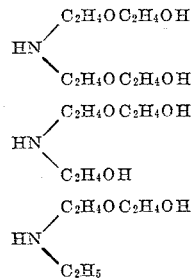

Such amines may serve as functional equivalents of the previously described amines, which happen to be free from an ether linkage. Likewise, one may have amines in which there is more than one ether linkage, i. e., in which the hydrocarbon radical which replaces an amino hydrogen atom has been interrupted more than once by an oxygen atom.

In examining the previous formulas, it becomes evident that if two different amines are employed, one of which does not contain a hydroxylated hydrocarbon radical, then the reaction is not limited to two dissimilar amines, but may take place in part in such a manner as to involve two similar amines, i. e., the aldehyde may react with two molecules of the hydroxylated amine; it may react with one mole of the hydroxylated amine, and one mole of the non-hydroxylated amine; or it may unite with two moles of the non-hydroxylated amine. In such event, as last mentioned, the resultant compound is without value, unless a hydroxy aldehyde, such as aldol, has been employed. For practical purposes, then, it is most expedient to manufacture or produce a methylene diamine from a single kind of secondary amine; and in such event, obviously it must be a hydroxylated amine, such as diethanolamine. In subsequent examples, diethanolamine is employed as the secondary amine for reaction with the aldehyde. However, in view of what has been said previously, various other secondary amines or mixtures thereof might be employed. It is not the intention to indicate that the tertiary diamine may not have more free hydroxyl radicals than are required for subsequent reaction with the polybasic carboxy acid present. As a matter of fact, generally speaking, it is desirable to have an excess of such alcoholic hydroxyl radicals.

Previous reference has been made to the fact that polybasic acids themselves, or their functional equivalents, such as the anhydrides, are not generally suitable for reaction with the tertiary hydroxylated diamines, except under special circumstances. It is necessary that the polybasic carboxy acid body be of the kind which is characterized by the presence of a detergent-forming fatty acid radical. Such polybasic carboxy acid bodies are derived from various polybasic acids, or their obvious equivalents, such as the anhydrides, or acyl chlorides or the like; and included among the various polybasic acids which may be used are: phthalic, succinic, malic, fumaric, citric, maleic, adipic, tartaric, glutaric, diphenic, naphthalic, oxalic, chlorphthalic, nitrophalic, etc., some of which have three carboxyl radicals.

Such acids or their functional equivalents, such as phthalic anhydride, react readily with hydroxy detergent-forming acid, such as ricinoleic acid, diricinoleic acid, blown fatty acids, hydroxy stearic acid, dihydroxy stearic acid, polyricinoleic acid, oxy-naphthenic acid, oxyabietic acid, triricinolein, trihydroxystearin, ethylene glycol diricinoleate, ethylene glycol dihydroxystearate, ethyl ricinoleate, and the like, to produce polybasic acid derivatives characterized by: (a) an unreacted carboxyl radical attached to the polybasic carboxy acid residue; and (b) a radical derived from the detergent-forming acid.

Another type of polybasic acid compound suitable for the purpose previously described is the type obtained by reaction between a polybasic acid, or its functional equivalent, such as phthalic acid, and a superglycerinated fat or the equivalent thereof, derived from a resin acid or a naphthenic acid. One can readily prepare materials such as mono-olein, di-olein, monostearin, distearin, monoricinolein, diricinolein, mononaphthenin, dinaphthenin, mono-abietin, di-abietin, or similar compounds from various polyglycerols, various glycols, etc. Such compounds are characterized by the presence of at least one alcoholic hydroxyl radical, and at least one detergent-forming acid radical. Such compounds can be reacted readily with a polybasic carboxy acid, or its functional equivalent, such as phthalic anhydride, to yield compounds which have the same characteristics as those previously described, i. e., (a) an unreacted carboxyl radical attached to the polybasic carboxy acid residue; and (b) a radical derived from the detergent-forming acid, having at least 8 carbon atoms and not more than 32 carbon atoms.

Having obtained the hydroxylated tertiary methylene diamine of the kind previously described, either acylated or not with an acid having less than 8 carbon atoms, and having obtained a polybasic carboxy acid body, as previously indicated, the composition of matter used as the demulsifier in our process is obtained by esterification reaction between the two aforementioned products, which is comparable in nature to reactions of the kind which take place between benzoic acid or phthalic anyhdrides and an alcohol which is monohydric or polyhydric in nature, such as glycerol or ethylene glycol, diethylene glycol, diglycerol, diethanolamine, triethanolamine, or the like, all of which are well known. The conditions of reaction are substantially the same as employed in the types of reaction just enumerated. The diamine is preferably employed in the anhydrous state.

At this point it may be well to summarize what has been said previously. The composition of matter herein contemplated is derived from four components combined in three steps; (a) an aldehyde of the kind described, and a secondary amine of the kind described are reacted to form a hydroxylated diamine. (b) A polybasic acid, such as phthalic anhydride, is reacted with a suitable detergent-forming acid or acid body to yield a polybasic acid body of the kind previously described. (c) The two previously mentioned products of reaction enter as reactants into the third reaction producing the composition of matter herein contemplated by esterification. Needless to say, what has been said previously in regard to the use of an unesterified polybasic acid, such as phthalic anhydride, can now be modified and can be re-stated in the following manner:

An unmodified polybasic acid can be employed to react with the hydroxylated diamine, provided that after such reaction a third reaction takes place involving a detergent-forming acid or a detergent-forming acid body in such a way that an unreacted carboxyl radical attached to the polybasic carboxy acid residue, is esterified with said detergent-forming acid body. In essence, this is just an alternate form of producing the herein contemplated composition of matter; and it is intended that in the hereto attached claims the process of manufacture there stated shall be considered as including within its scope the obvious functional variation which has just been described, to wit, the one in which unreacted polybasic acids or their equivalents are employed, and then subsequently reacted with an appropriate detergent-forming acid body.

Our preferred reagent is obtained in the following manner:

We convert any suitable quantity of castor oil, for instance, 1,000 pounds or thereabouts, into a phthalated derivative consisting largely of diphthalated castor oil. Our preference is to consider castor oil as containing about 85% triricinolein, and to add approximately 2¼ moles of phthalic anhydride, based on such assumption. The product so obtained consists largely of diphthalated ricinolein, but will also contain some monoricinolein, and perhaps small amounts of triphthalated triricinolein. It may also contain small amounts of the materials in which one phthalic acid residue or radical acts as a bridge between two alcoholic hydroxyl radicals.

We prefer to react a readily available aldehyde, such as acetaldehyde or heptaldehyde, in the molecular proportions of one mole of aldehyde with two moles of diethanolamine. Such reaction is conducted in the manner previously noted; and after completion of reaction, any water still present which has not been removed during the course of reaction is removed by distillation, preferably under vacuum. We prefer to react the two previously described reactants or ingredients in approximately equal molecular quantity. Thus, if we started originally with approximately 1,000 lbs. of castor oil containing about 850 lbs. of triricinolein, to which we would have added 304 lbs. of phthalic anhydride, our preference then would be to add 215 lbs. of the diamine derived from acetaldehyde and diethanolamine. These two products are heated at a temperature above the boiling point of water, but below the point of decomposition, for instance, somewhere approximating 120–175°, until esterification has taken place to the desired degree. If the product is intended for use in demulsification of crude oil, a sample can be withdrawn every 5 or 10 minutes during the esterification process and tested on some typical emulsion. In this manner the most suitable point of reaction can be determined.

The tertiary methylene diamine of the kind described previously may be considered, for the sake of simplicity, as being in the class of an alcohol, i. e., a monohydric or polyhydric alcohol. If an alcohol is indicated by the formula $Y'(OH)_n$, where $n$ indicates the number 1 or more, and if a polybasic acid body be indicated by the formula $X'(COOH)_n$, where $n$ indicates the number 2 or more, then the reaction between a monohydric alcohol and a polybasic acid will result in a compound which may be indicated by the following formula: $YX(COOH)_{n'}$, wherein $n'$ indicates the number 1 or more, and which is in reality a contraction of a more elaborate structural formula, in which $X'$ and $Y'$ are joined by a carboxyl radical or residue. Assuming, however, as would be true in the majority of cases, that the alcohol actually would be a polyhydric alcohol, and that the acid body would be polybasic in nature, for instance, if one employed triricinolein diphthalate, then examination reveals that the formula might result in a combination, in which there were neither residual carboxyl radicals, nor residual hydroxyl radicals, or might result in compounds in which there were residual hydroxyl radicals, and no residual carboxyl radicals, or compounds where there might be residual carboxyl radicals and no residual hydroxyl radicals; or there might be both. This is indicated by the following:

$$(Y.X)_q(OH)_{n'}$$

$$(Y.X)_q(COOH)_{m'}$$

$$(OH)_{n''}(YX)_q(COOH)_{m''}$$

in which $q$ indicates a small whole number (one in the case of a monomer, and probably not over 20 and usually less than 10), and $m'$ and $n'$ indicate the number 1 or more, and $m''$ and $n''$ indicate zero or a small or moderately-sized whole number, such as zero, one or more, but in any event, probably a number not in excess of 40; for instance, as would be indicated by a molecule which involved 10 to 15, or perhaps 20 moles of a methylene diamine derived from aldol and diglycerylamine. Naturally, each residual hydroxyl could combine with a phthalic acid body or its equivalent, or with a similar compound derived from a tribasic acid, such as citric acid; and in such event, there would be a large number of free or uncombined carboxyl radicals present, possibly 200 or more. Actually, the preferable type of reagent would be more apt to include less than 20, and in fact, less than 10 free hydroxyl radicals. It is not necessary to remark that the residual carboxyl radicals can be permitted to remain as such, or can be neutralized in any suitable manner, such as conversion into salts, esters, amides, amino esters, or any other suitable form. Usually, such conversion into salt form would be by means of sodium hydroxide, potassium hydroxide, calcium hydroxide, magnesium hydroxide, ammonium hydroxide, amylamine, butanolamine, ethanolamine, diethanolamine, triethanolamine, cyclohexanolamine, benzylamine, aniline, toluidine, etc. Conversion into the ester would be by means of a monohydric alcohol, such as methyl alcohol, ethyl alcohol, propyl alcohol, butyl alcohol, hexyl alcohol, octyl alcohol, decyl alcohol, ethylene glycol, diethylene glycol, glycerol, diglycerol, triethylene glycol, or the like. One could employ an amino alcohol so as to produce an ester.

If a tricarboxy acid, such as citric acid, is employed, then at least theoretically two moles of the tertiary methylene diamine might react with one mole of the citric acid compound. Similarly, as has already been pointed out, a large number of molecules of a polybasic acid compound might combine with a single molecule of a highly hydroxylated methylene amine. For practical purposes, however, we have found that the most desirable products are obtained by combinations, in which the ratio of alcoholic diamine to the polybasic acid is within the ratio of 3 to 1 and 1 to 5, and in which the molecular weight of the resultant product does not exceed 10,000, and is usually less than 5,000, or perhaps less than 3,000. This is particularly true, if the resultant product is soluble to a fairly definite extent, for instance, at least 5%, in some solvent, such as water, alcohol, benzene, dichlor ethyl ether, acetone, cresylic acid, or the like. This is simply another way of stating that it is preferable, if the product be one of the sub-resins, which are commonly referred to as an A resin, or B resin, as distinguished from a C resin, which is a highly infusible, insoluble resin (see Ellis, Chemistry of Synthetic Resins, 1935, page 862 et seq.).

In recapitulating what has been said previously, the sub-resinous, semi-resinous, or resinous product herein contemplated may be indicated by the following formula:

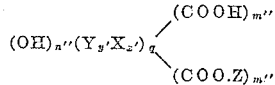

in which the characters have their previous significance, and $y'$ represents a small whole number not greater than 3, and $x'$ represents a small whole number not greater than 5; Z represents a hydrogen ion equivalent, such as a metallic atom, organic radical, etc.

One must not lose sight of the fact that the product used as the demulsifier in our process is a basic amine. This means, of course, that the product can combine with acids to form salts; for instance, it may combine with acetic acid, hydrochloric acid, oxalic acid, phthalic acid, butyric acid, naphthenic acid, etc. To state the matter another way, the amine used as the demulsifier in our process, if desired, may be dissolved in a dilute acid, such as 5% of acetic acid, 5% sulfuric acid, 5% nitric acid, or the like. The amine may be used as such, or as an aqueous solution, which in essence represents the corresponding diammonium base. In other words, all references herein to the final product, and particularly in the appended claims, contemplate not only the amine itself, but the corresponding salts or double salts, the corresponding base or double base, the corresponding salt base mixture, or similar variations, which may be indicated from this viewpoint solely by the following monomeric type formulas:

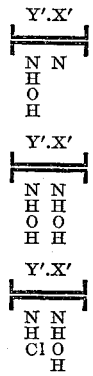

All that has been said previously can be recast in a single formula, in view of the following consideration: The aldehyde employed may be indicated by the following formula:

in which T represents a member of the class consisting of hydrogen atoms, hydrocarbon radicals, hydroxy hydrocarbon radicals, or an acylated hydrocarbon radical, in which the acyl radical is derived from an acid having less than 8 carbon atoms. Such aldehyde combines with two molecules of an amine, which may or may not contain an acyl group derived from an acid having less than 8 carbon atoms. The combination so obtained is an intermediate amine, which may be indicated by the following formula:

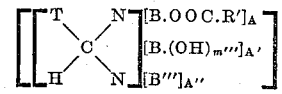

in which T has the same significance previously indicated; B is a divalent hydrocarbon radical, which may be interrupted at least once by an oxygen atom; B''' is a hydrocarbon radical; A, A' and A'' represent the numbers 0, 1, 2, 3, or 4, with the proviso that $A+A'+A''$ shall equal 4; and there must be present at least one alcoholic hydroxyl radical.

The final composition of matter herein contemplated as a demulsifier may be characterized for the sake of simplicity in the following manner, and it is to be noted that certain sub-letters are hereinafter changed for purposes of simplicity:

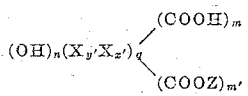

in which $y'$ represents a small whole number not greater than 3, and $x'$ represents a small whole number not greater than 5, and $n$, $m$, and $m'$ indicate small whole numbers, such as 0, 1, or more, but in any event, probably a number not in excess of 40, and more likely not over 20; $q$ indicates a small whole number not over 20, and usually less than 10, Z is a hydrogen ion equivalent; Y is a residue or radical derived from a hydroxylated tertiary diamine of the type:

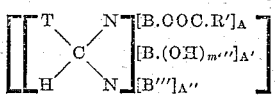

in which T has the same significance previously indicated, B is a divalent hydrocarbon radical, which may be interrupted at least once by an oxygen atom; B''' is a hydrocarbon radical; R'COO is an oxy-acyl radical derived from an acid having less than 8 carbon atoms; $m'''$ represents the numbers 1, 2 or 3; A, A' and A'' represent the numbers 0, 1, 2, 3 or 4, with the proviso that $A+A'+A''$ shall equal 4 and X is a residue derived from a polybasic acid compound of the kind characterized by (a) the presence of an unreacted carboxy radical attached to the polybasic carboxy acid residue; and (b) a radical derived from a detergent-forming acid having at least 8 carbon atoms and not more than 32 carbon atoms; and said composition of matter being additionally characterized by the fact that the linkage between the residue or radical indicated by Y, and the residue or radical indicated by X is such that it involves at least one carboxyl radical attached to X.

When aldehydes and secondary amines react, in addition to the tertiary methylene diamine, there may be formed minor by-products, such as polymeric forms and the like. Similarly, it is possible that other by-products or cogeneric compounds are formed in the cogeneric reactions described. As far as demulsification of crude oil or similar purposes are concerned, it is quite probable that the presence of such cogeneric materials is not objectionable, but may be desirable. Therefore, in order to completely define the meets and bounds of the present invention, it is deemed advisable to characterize the final product not only by means of the formula above described, but also in terms of the steps of manufacture. It is obvious that certain alternate forms of the steps of manufacture may be employed, but they would be the obvious equivalents of the steps indicated. Indeed, one such obvious modification has already been described.

It is believed that the principal product of reaction previously described is obtained through the formation of an intermediate commonly referred to as a pseudo-carbinol. See Journal of the Chemical Society, volume 119, 1921, page 1470, and also volume 123, 1923, page 532. The formation of the intermediate may be indicated thus:

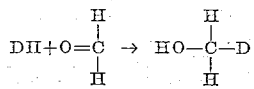

where DH is a molecule having a labile hydrogen atom. Such products are pseudo-carbinols, and in the event that D is connected to the carbon atom by means of a nitrogen atom, for instance, where D was derived from diethanolamine, then the previous formula becomes:

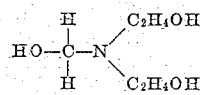

and compounds which carry the linkage

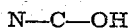

are commonly referred to as pseudo-basic carbinols.

One recognized property of the pseudo-basic carbinols is the avidity of the hydroxyl radical for a labile hydrogen atom. Thus, the above intermediate would immediately react with a second molecule of diethanolamine to form the diamine previously described. This is indicated in the following manner:

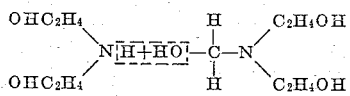

Such being the probable course of reaction, it is obvious that considerable insight is disclosed as to the nature of the accompanying cogeneric materials, which are present in the mixture. In other words, one would expect to find material in which the hydrogen atom was removed from other sources, as, for instance, a hydrogen of the hydroxyl of an ethanol radical, etc.

The new process that we have devised for resolving or breaking petroleum emulsions of the water-in-oil type involves subjecting the emulsion to the action of a demulsifier consisting of the above described new material or composition of matter. Said material is used either alone, or in admixture with another, or with other conventional demulsifying agents; and its method of use is the same as that generally employed in resolving or breaking petroleum emulsions of the water-in-oil type with a chemical demulsifier. Briefly stated, the conventional method of using a chemical demulsifier to break a petroleum emulsion consists in introducing the demulsifier into the well in which the emulsion is produced; introducing the demulsifier into a conduit through which the emulsion is flowing; or introducing the demulsifier into a tank in which the emulsion is stored. After treatment the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. The amount of demulsifier that may be required to break the emulsion may vary from 1 part of demulsifier to 500 parts of emulsion, up to 1 part of demulsifier to 20,000, or even 30,000 parts of emulsion.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

Having thus described our invention, what we claim as new and desire to secure by Letters Patent is:

1. A process for resolving petroleum emulsions of the water-in-oil type, characterized by subjecting the emulsion to the action of a demulsifier, comprising an esterification product of the formula type:

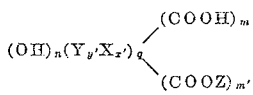

in which $y'$ represents a small whole number not greater than 3, and $x'$ represents a small whole number not greater than 5, and $n$, $m$ and $m'$ indicate small whole numbers such as 0, 1, or more, but not in excess of 40; $q$ indicates a small whole number not over 20; Z is a hydrogen ion equivalent; Y is a residue or radical derived from a hydroxylated tertiary diamine of the type:

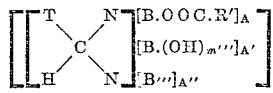

in which T represents a member of the class consisting of hydrogen atoms, hydrocarbon radicals, hydroxy hydrocarbon radicals, and an acylated hydrocarbon radical in which the acyl radical is derived from an acid having less than 8 carbon atoms; B is a divalent hydrocarbon radical which may be interrupted at least once by an oxygen atom; $B'''$ is a hydrocarbon radical; $R'COO$ is an oxy-acyl radical derived from an acid having less than 8 carbon atoms; $m'''$ represents the numbers 1, 2, or 3; A, A' and A'' represent the numbers 0, 1, 2, 3 or 4, with the proviso that $A+A'+A''$ shall equal 4; and there must be present at least one alcoholic hydroxyl radical; and X is a residue derived from a polybasic carboxy acid compound of the kind characterized by (a) the presence of an unreacted carboxyl radical attached to the polybasic carboxy acid residue; and (b) a radical derived from a detergent-forming acid having at least 8 carbon atoms and not more than 32 carbon atoms; said composition being characterized by the fact that the linkage between the residue or radical indicated by Y and the residue or radical indicated by X is such that it involves at least one carboxyl radical attached to X.

2. A process for resolving petroleum emulsions of the water-in-oil type, characterized by subjecting the emulsion to the action of a demulsifier, comprising an esterification product of the formula type:

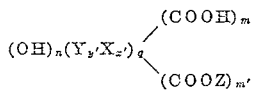

in which $y'$ represents a small whole number not greater than 3, and $x'$ represents a small whole number not greater than 5, and $n$, $m$, and $m'$ indicate small whole numbers such as 0, 1, or more, but not in excess of 40; $q$ indicates a small whole number not over 20; Z is a hydrogen ion equivalent; Y is a residue or radical derived from a hydroxylated non-aryl tertiary diamine of the type:

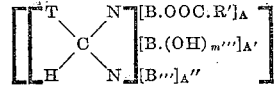

in which T represents a member of the class consisting of hydrogen atoms, hydrocarbon radicals, hydroxy hydrocarbon radicals, and an acylated hydrocarbon radical in which the acyl radical is derived from an acid having less than 8 carbon atoms; B is a divalent hydrocarbon radical which may be interrupted at least once by an oxygen atom; $B'''$ is a hydrocarbon radical; $R'COO$ is an oxy-acyl radical derived from an acid having less than 8 carbon atoms; $m'''$ represents the numbers 1, 2 or 3; A, A' and A'' represent the numbers 0, 1, 2, 3 or 4, with the proviso that $A+A'+A''$ shall equal 4; and there must be present at least one alcoholic hydroxyl radical; and X is a residue derived from a polybasic carboxy acid compound of the kind characterized by (a) the presence of an unreacted carboxy radical attached to the polybasic carboxy acid residue; and (b) a radical derived from a detergent-forming acid having at least 8 carbon atoms and not more than 32 carbon atoms; said composition being characterized by the fact that the linkage between the residue or radical indicated by Y and the residue or radical indicated by X is such that it involves at least one carboxyl radical attached to X.

3. A process for resolving petroleum emulsions of the water-in-oil type, characterized by subjecting the emulsion to the action of a demulsifier obtainable by reaction between: (A) a polybasic carboxy acid compound of the kind characterized by (a) the presence of an unreacted carboxy radical attached to the polybasic carboxy acid residue; and (b) a radical derived from a detergent-forming acid having at least 8 carbon atoms and not more than 32 carbon atoms; and (B) a hydroxylated diamine derived by reaction between: first, a secondary amine; and second, an aldehyde; said new composition of matter being additionally characterized by the fact that the linkage between the diamine radical and the polybasic carboxy acid body must involve at least one carboxyl radical attached to the polybasic carboxy acid residue.

4. A process for breaking petroleum emulsions of the water-in-oil type, characterized by subjecting the emulsion to the action of a demulsifier obtainable by reaction between: (A) a polybasic carboxy acid compound of the kind characterized by (a) the presence of an unreacted carboxy radical attached to the polybasic carboxy acid residue; and (b) a radical derived from a detergent-forming acid having at least 8 carbon atoms and not more than 32 carbon atoms; and (B) a hydroxylated diamine derived by reaction between: first, a non-aryl secondary amine; and second, an aldehyde; said new composition of matter being additionally characterized by the fact that the linkage between the diamine radical and the polybasic carboxy acid body must involve at least one carboxyl radical attached to the polybasic carboxy acid residue.

5. A process for breaking petroleum emulsions of the water-in-oil type, characterized by subjecting the emulsion to the action of a demulsifier obtainable by reaction between: (A) a polybasic carboxy acid compound of the kind characterized by: (a) the presence of an unreacted carboxy radical attached to the polybasic carboxy acid residue; and (b) a radical derived from a detergent-forming acid having at least 8 carbon atoms and not more than 32 carbon atoms; and (B) a hydroxylated diamine derived by reaction between: first, an aliphatic secondary amine; and second, an aldehyde; said new composition of matter being additionally characterized by the fact that the linkage between the diamine radical and the polybasic carboxy acid body must involve at least one carboxyl radical attached to the polybasic carboxy acid residue.

6. A process for breaking petroleum emulsions of the water-in-oil type, characterized by subjecting the emulsion to the action of a demulsifier obtainable by reaction between: (A) a polybasic carboxy acid compound of the kind characterized by: (a) the presence of an unreacted carboxy radical attached to the polybasic carboxy acid residue; and (b) a radical derived from a detergent-forming acid having at least 8 carbon atoms and not more than 32 carbon atoms; and (B) a hydroxylated diamine derived by reaction between: first, an aliphatic secondary amine; and second, an aliphatic aldehyde; said new composition of matter being additionally characterized by the fact that the linkage between the diamine radical and the polybasic carboxy acid body must involve at least one carboxyl radical attached to the polybasic carboxy acid residue.

7. A process for breaking petroleum emulsions of the water-in-oil type, characterized by subjecting the emulsion to the action of a demulsifier obtainable by reaction between: (A) a polybasic carboxy acid compound of the kind characterized by: (a) the presence of an unreacted carboxy radical attached to the polybasic carboxy acid residue; and (b) a radical derived from a fatty acid having at least 8 carbon atoms and not more than 32 carbon atoms; and (B) a hydroxylated diamine derived by reaction between: first, an aliphatic secondary amine; and second, an aliphatic aldehyde; said new composition of matter being additionally characterized by the fact that the linkage between the diamine radical and the polybasic carboxy acid body must involve at least one carboxyl radical attached to the polybasic carboxy acid residue.

8. A process for breaking petroleum emulsions of the water-in-oil type, characterized by subjecting the emulsion to the action of a demulsifier obtainable by reaction between: (A) a polybasic carboxy acid compound of the kind characterized by: (a) the presence of an unreacted carboxy radical attached to the polybasic carboxy acid residue; and (b) a radical derived from an unsaturated fatty acid having at least 8 carbon atoms and not more than 32 carbon atoms; and (B) a hydroxylated diamine derived by reaction between: first, an aliphatic secondary amine; and second, an aliphatic aldehyde; said new composition of matter being additionally characterized by the fact that the linkage between the diamine radical and the polybasic carboxy acid body must involve at least one carboxyl radical attached to the polybasic carboxy acid residue.

9. A process for breaking petroleum emulsions of the water-in-oil type, characterized by subjecting the emulsion to the action of a demulsifier obtainable by reaction between: (A) a polybasic carboxy acid compound of the kind characterized by: (a) the presence of an unreacted carboxy radical attached to the polybasic carboxy acid residue; and (b) a radical derived from ricinoleic acid; and (B) a hydroxylated diamine derived by reaction between: first, an aliphatic secondary amine; and second, an aliphatic aldehyde; said new composition of matter being additionally characterized by the fact that the linkage between the diamine radical and the polybasic carboxy acid body must involve at least one carboxy radical attached to the polybasic carboxy acid residue.

10. A process for breaking petroleum emulsions of the water-in-oil type, characterized by subjecting the emulsion to the action of a demulsifier obtainable by reaction between: (A) a dibasic carboxy acid compound of the kind characterized by: (a) the presence of an unreacted carboxy radical attached to the dibasic carboxy acid residue; and (b) a radical derived from ricinoleic acid; and (B) a hydroxylated diamine derived by reaction between: first, an aliphatic secondary amine; and second, an aliphatic aldehyde; said new composition of matter being additionally characterized by the fact that the linkage between the diamine radical and the dibasic carboxy acid body must involve at least one carboxyl radical attached to the dibasic carboxy acid residue.

11. A process for breaking petroleum emulsions of the water-in-oil type, characterized by subjecting the emulsion to the action of a demulsifier obtainable by reaction between: (A) a phthalic acid compound of the kind characterized by: (a) the presence of an unreacted carboxy radical attached to the phthalic acid residue; and (b) a radical derived from ricinoleic acid; and (B) a hydroxylated diamine derived by reaction between: first, an aliphatic secondary amine; and second, an aliphatic aldehyde; said new composition of matter being additionally characterized by the fact that the linkage between the diamine radical and the phthalic acid body must involve at least one carboxyl radical attached to the phthalic acid residue.

12. A process for breaking petroleum emulsions of the water-in-oil type, characterized by subjecting the emulsion to the action of a demulsifier obtainable by reaction between: (A) a phthalic acid compound of the kind characterized by: (a) the presence of an unreacted carboxy radical attached to the phthalic acid residue; and (b) a radical derived from ricinoleic acid; and (B) a hydroxylated diamine derived by reaction between: first, an aliphatic secondary amine; and second, an aliphatic aldehyde having not more than 4 carbon atoms; said new composition of matter being additionally characterized by the fact that the linkage between the diamine radical and the phthalic acid body must involve at least one carboxyl radical attached to the phthalic acid residue.

13. A process for breaking petroleum emulsions of the water-in-oil type, characterized by subjecting the emulsion to the action of a demulsifier obtainable by reaction between: (A) a phthalic acid compound of the kind characterized by: (a) the presence of an unreacted carboxy radical attached to the phthalic acid residue; and (b) a radical derived from ricinoleic acid; and (B) a hydroxylated diamine derived by reaction between: first, an aliphatic secondary amine; and second, formaldehyde; said new composition of matter being additionally characterized by the fact that the linkage between the diamine radical and the phthalic acid body must involve at least one carboxyl radical attached to the phthalic acid residue.

14. A process for breaking petroleum emulsions of the water-in-oil type, characterized by subjecting the emulsion to the action of a demulsifier obtainable by reaction between: (A) a phthalic acid compound of the kind characterized by: (a) the presence of an unreacted carboxy radical attached to the phthalic acid residue; and (b) a radical derived from ricinoleic acid; and (B) a hydroxylated diamine derived by reaction between: first, an aliphatic secondary amine; and second, an acetaldehyde; said new composition of matter being additionally characterized by the fact that the linkage between the diamine radical and the phthalic acid body must involve at least one carboxyl radical attached to the phthalic acid residue.

15. A process for breaking petroleum emulsions of the water-in-oil type, characterized by subjecting the emulsion to the action of a demulsifier obtainable by reaction between: (A) a phthalic acid compound of the kind characterized by: (a) the presence of an unreacted carboxy radical attached to the phthalic acid residue; and (b) a radical derived from ricinoleic acid; and (B) a hydroxylated diamine derived by reaction between: first, an aliphatic secondary amine; and second, aldol; said new composition of matter being additionally characterized by the fact that the linkage between the diamine radical and the phthalic acid body must involve at least one carboxyl radical attached to the phthalic acid residue.

MELVIN DE GROOTE.
BERNHARD KEISER.